Figure 1:
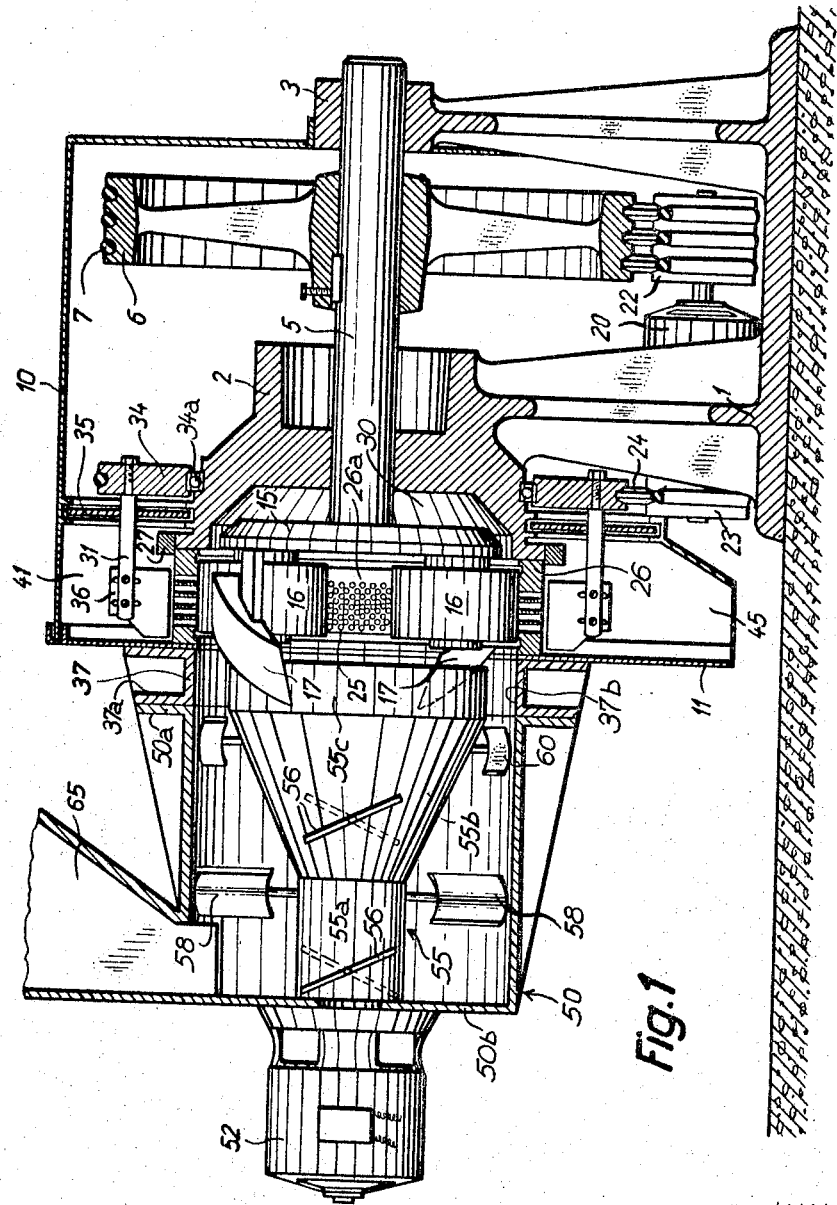

INVENTOR
ALBERT HÄFLIGER

United States Patent Office 3,332,111
Patented July 25, 1967

3,332,111
EXTRUSION PRESS HAVING ROTATABLE PRESS MEANS AND A SEPARATE FEED DRIVE
Albert Häfliger, Gossau, Saint Gall, Switzerland, assignor to Gebruder Buhler, Uzwil, Switzerland
Filed Nov. 30, 1965, Ser. No. 510,533
Claims priority, application Switzerland, Dec. 1, 1964, 15,486/64; Apr. 9, 1965, 5,034/65; Oct. 25, 1965, 14,696/65
7 Claims. (Cl. 18—12)

This invention relates, in general, to a rotary press construction and, in particular, to a new and useful press for the extrusion of parts of limited length including a stationary press mold having openings through which the material is extruded by rotary press elements which rotate over the surface of the mold, and to an improved feeding construction and housing arrangement therefor.

The present invention is an improvement over the prior art, particularly in respect to the construction of the feeder drum and feeder ring which is associated with the stationary press member for feeding the material thereto. In accordance with the invention, it was found that the quality of the extruded material could be improved if the feeding arrangement included a rotatable screw which is rotatable under power separately from the press rollers and which rotates relative to the feeder ring or feeder drum with which it is associated.

A feature of the construction is that the feeder screw is mounted for separate driving rotation relative to the feeder drum or feeder ring. In a preferred arrangement, the feeder drum and/or feeder ring is arranged in a stationary manner and preferably in a manner such that a bearing portion may be tensioned against the extrusion ring.

In accordance with one embodiment of the invention, the feeding arrangement is advantageously mounted on the stationary frame containing the fixed extrusion ring in a manner such that it may be completely removed. The feeding arrangement includes a separate driving motor for an advancing screw which is rotated relative to a stationary housing defining a feeding drum or feeding ring for feeding the material into the extrusion ring.

In a further embodiment of the invention, the feeder housing, which includes the feeder drum or feeder ring and the advancing screw, is advantageously mounted such that it may be tensioned in position against the extrusion ring. In addition, it is advantageous to mount it so that it may be pivoted outwardly from the ring in order to permit easy removal of the ring.

In still a further embodiment of the invention, the tension between the extrusion mold ring and the stand is regulated either mechanically or advantageously by a hydraulic arrangement formed by interengaging piston and cylinder portions of mating housing parts. The tension may be controlled by regulating the pressure of fluid in an annular chamber defined between a projecting piston portion and a receiving cylinder portion of the housing parts.

Accordingly, it is an object of the invention to provide an improved press which includes a press mold having a feeder housing construction connected thereto at the entrance side forming either a feed drum or feed ring in which is arranged a separately driven advancing screw.

A further object of the invention is to provide a press which includes a press mold stationarily mounted on a frame with means for rotating rollers around the interior periphery of the mold to cause the extrusion of material through the openings defined through the wall thereof, and further to an arrangement in which the material is fed to the mold by means which may be adjustably tensioned in respect to the pressure mold and which may be opened outwardly away therefrom for facilitating the removal and replacement of the mold.

A further object of the invention is to provide a press using rotatable press rollers which rotate around on the interior circumference of a press mold having openings through which the material is extruded and which includes shovel elements for each of the press rollers which are arranged to scrape against the interior surface of a mold drum or mold ring and wherein the mold ring is formed of casing member which is adapted to be secured to the frame of the pressure ring and includes a separate feed element for advancing the material therein.

A further object of the invention is to provide a press which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 2:
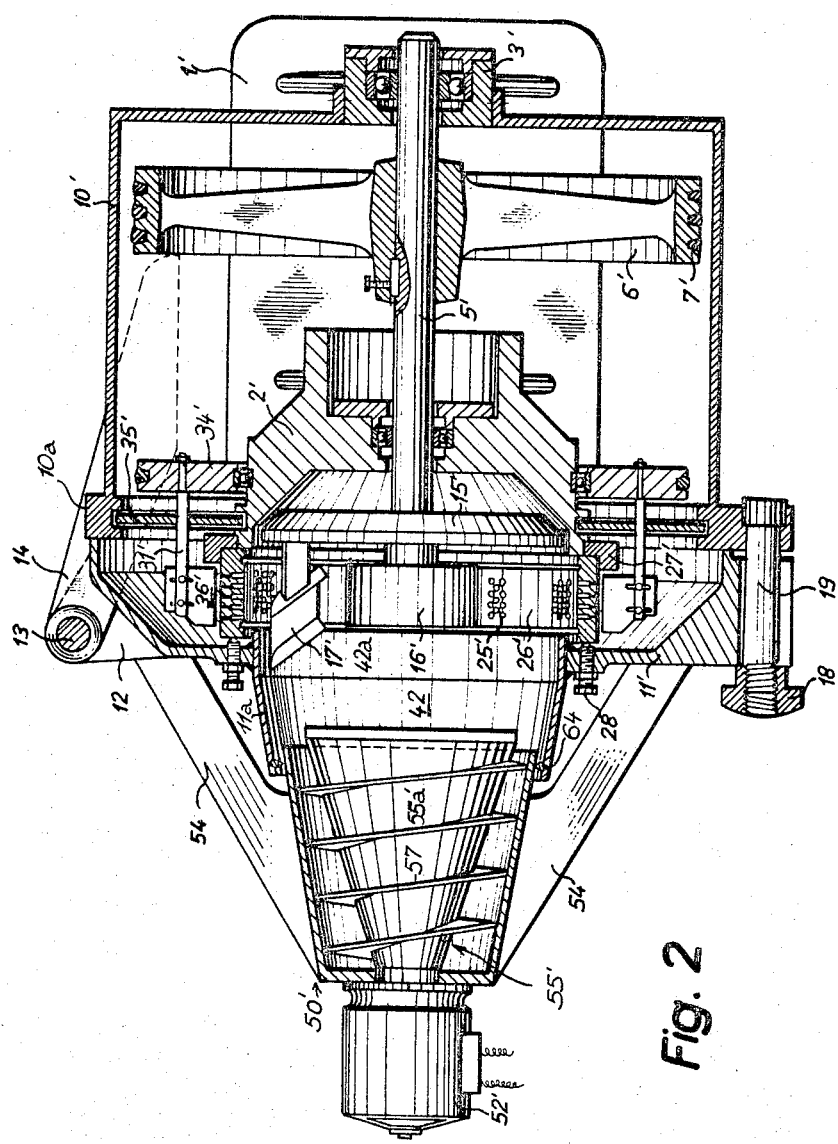
Figure 3:
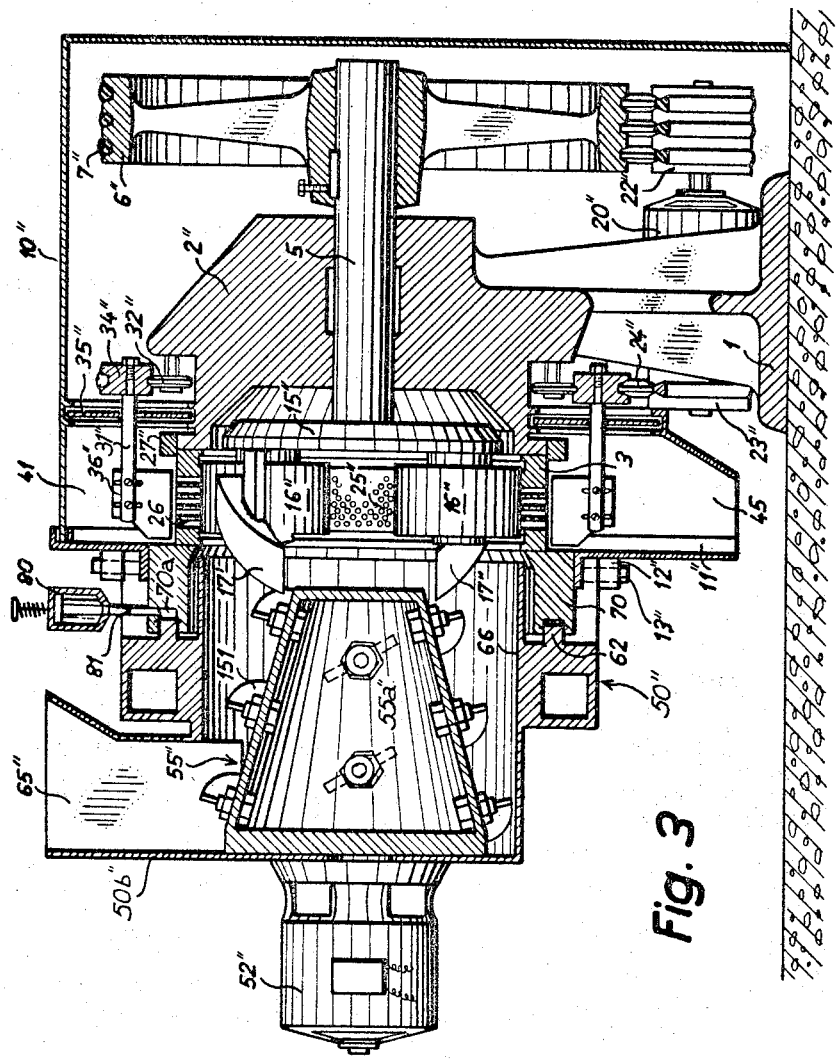

In the drawings:
FIG. 1 is a vertical sectional view of a press constructed in accordance with the invention;
FIG. 2 is a horizontal sectional view of another embodiment of the press; and
FIG. 3 is a vertical sectional view similar to FIG. 1 of another embodiment of the invention.

Referring to the drawings in particular, the invention embodied therein as indicated in FIG. 1 comprises a rotary press which includes a base plate having spaced stand elements 2 and 3 projecting upwardly therefrom which rotatably support a shaft 5 in a manner such that its forward portion is located within a chamber 30 formed at the forward end of the stand 2. A rotatable disc element 15 is affixed to the shaft 5 for rotation therewith and it carries press means such as rotatable press rollers 16 and 16 which are rotatably mounted on the disc 15 at locations such that they bear against the interior wall 26a of a press mold or press mold ring 26. Each roller 16, 16 carries an associated shovel 17, 17 which extends outwardly from the associated rollers and scrapes away the material which is fed against the interior surface 37b of a cylindrical housing portion or feeder drum 37. The press mold 26 is attached to the stand 2 by means of tensioning elements or a wearing ring 27.

The shaft 5 carries a wheel or pulley 6 which is driven from a pulley 22 by belts 7. The pulley 22 is carried on the shaft of a driving motor 20. The motor 20 also drives a pulley 23 which rotates an annular disc member or drive disc 34 on roller bearings 34a through a connecting belt 24. The disc member 34 carries projecting carriers or bolts 31 which carry at their outer ends scraping knives 36 which overlie the periphery of the exterior of the press mold 26. A dust disc 35 which rotates with the scrapers 36 is carried intermediate the length of the bolt 31 and rides in recesses defined in the frame portion 2 and in an outer housing or motor housing 10 and prevents the dust from going into the frame housing or drive compartment including the motor 20. The dust disc 35 defines, together with an end wall or cover 11, a chamber 41 into which the material is extruded through openings 25 defined in the press mold 26. The material exits from the chamber 41 through a lower discharge opening 45. The drive disc 34 with the scraping knives 36 is thus rotated synchronously or at an adjustable relative speed in respect to the press rollers 16, 16 and their feed shovels 17, 17. The scraping knife rotation, of course, may be adjusted with regard to the rotational speed of the press rollers 16, 16.

A feature of the invention is that the feeder drum 37 and a separate feed housing 50 may be detachably secured to the motor housing 10 by usual flange portions 50a and 37a which may be held together by suitable tension elements (not shown). The feed housing 50 is provided with an upwardly extending portion forming an inlet 65 to which the material to be treated is fed. An end wall 50b of the feed housing 50 provides a mounting base for a motor 52 and a feed worm or feed screw generally designated 55. In the embodiment illustrated, the feed screw 55 includes a cylindrical portion 55a, a frusto conical portion 55b and a large diameter cylindrical portion 55c. The motor 52 is arranged to rotate the feed screw 55 independently of the speed of operation of the shaft 5 and the press rollers 16, 16. In the present embodiment, in contrast to the prior art constructions, the feed screw 55 is not provided with one or several helical gears but with a plurality of blades 56, 56 which are obliquely arranged on opposite sides of the cylindrical portion 55 and the conical portion 55b. In addition, two blade elements 58 and 60 are arranged at spaced locations along the feed housing 50 to facilitate the even feeding of the material.

A further feature of the invention indicated in FIG. 1 is that the feed housing 50 and the feeder drum 37 are swingable relative to the press ring 26 and frame 2 and may be tensionally attached to the press ring by a tensioning device which is not indicated in FIG. 1.

A specially constructed wearing ring 27 is positioned at the location of the periphery press ring 26 and provides a means for radially centering the ring 26.

The internal diameter of the feeder drum 37 is substantially equal to the internal diameter of the press mold 26 so that the scrapers may effect an easy transfer of the material to the interior surface of the press mold 26.

The operation of the device is as follows:

The material to be pressed (which are usually pasty or granular materials primarily for fodder, but also powdery materials, scrap or synthetic materials and the like) is transported into the inlet 65 and falls downwardly on the relatively rapidly rotating feed worm 55. The rotation of the feed worm and the action of the blades 58 and 60 which are secured thereto causes the material in the stationary housing 50 and the feeder ring 34 to move in the direction of the press rollers 16, 16. The press rollers 16, 16 are also rotated but by the driving motor 20 independently of the feed worm. The materials flow from the feed housing 50 into the feeder drum 37 and an even film of material is formed on the surface 37b which is scraped off by the feed shovels 17, 17 and fed to the press rollers 16, 16. It is advantageous to rotate the feed worm 55 at a fast enough speed so that a thin film of material is formed in the feed housing 50 due to the centrifugal effect. Because of the action of the blades 58 and 60, and the action of the cylindrical portion 55c of the worm, the film or pasty or granular material forms in a rather even manner which permits a very smooth scraping off by the feed shovels 17, 17 and a very even feeding of the press rollers 16, 16. The even feeding of material to be pressed to the press rollers 16, 16 results in a uniform pressing out of these materials through the bores or openings 25 and thus results in an even formation of the extruded materials and ultimately, after scraping off by the knives 26, in pressed objects of a very uniform length.

Without deviating from the invention concept of the embodiment of FIG. 1, the feed worm 55 may be constructed conically with one or more worm gears from the area of the inlet opening 65 to the area of the feeder drum 37 and may be provided with a material conduit of constant width relative to the worm core. Further, the worm core may have a constant diameter, but the housing in the area of the inlet opening may have an interior diameter smaller than that in the area of the press mold. In such a case, blades similar to the blades 58 and 60 if different lengths are employed. It is also essential that the feed worm 55 is driven independently from the press rollers 16, 16 so that the feeding may be adjusted according to the material and the mold.

In the embodiment indicated in FIG. 2, there is provided a base plate 1' with stands 2' and 3' for supporting the shaft 5' which is driven through belt 7' and pulleys 6' as in the previous embodiment. In this embodiment, a housing 10' includes a reinforced flange portion 10a which provides an abutment for a swingable cover member 11'. The cover member 11' is pivotally mounted on a bracket 14 carried by the housing and it pivots about a pivot bolt 13 and is supported by an arm member 12. The housing is provided with an extension portion 11a which forms a portion of a frusto conical feed passage 42 and a cylindrical feed passage 42a which is of a slightly smaller interior diameter than the press mold 26'. A feed housing generally designated 50' is supported by supporting post 54, 54 to the cover member 11' and it provides a mounting base for a motor 52'.

A feature of the embodiment of FIG. 2 is that the feed screw 55' is made of frusto conical construction throughout and widens in a direction toward the rollers 16', 16' which are carried by a roller plate 15' which is affixed to shaft 5'. In addition, the feed conveyor 55' includes a continuous blade 57 of spiral configuration. The housing portion 50' is formed separately from the extension 11a and is sealed in respect thereto by an annular seal 64.

A further feature of the embodiment of FIG. 2 is that the portion 11' carries tension bolts 28 which may be tightened against an end face of the pressure mold ring 26' to cause it to be firmly seated in a wearing ring 27'. In the embodiment of FIG. 2, there is provided an annular member or drive disc 34' which is rotated by a motor (not shown) and which carries a dust ring 35' and the scrapers 36' as in the previous embodiment. A spacer bolt 19 carried by the flange portion 10a includes a nut 18 which may be threaded thereon which may be tensioned in order to accurately position the part 11' and this press mold ring 26'. The nut 18 is constructed in the form of a hand wheel in order to facilitate tightening or loosening thereof. When it is loosened, the whole member 11', together with the extension 11a and the housing 50', may be swung outwardly on the pivot bolt 13. This is an important feature because it permits the easy removal of the press mold 26' and the substitution of a new mold, if desired.

In the embodiment of FIG. 2, a feeder hopper similar to the hopper 65 of FIG. 1 is provided at the left-hand portion of the feed housing 50'.

The operation of the device of FIG. 2 is similar to that of FIG. 1. However, the constructional arrangements are different and it is possible to hold and center the annular press mold 26' solely by actual pressure force emanating from the cover 11'. The specially constructed wearing ring 27' facilitates the radial centering. In order to compensate for the differences in the dimensions of the press mold 26' and to compensate for the expansion of the cover 11' and its associated parts and tensioning elements, there are provided the axial screws 28 which may be threaded into the cover for the adjustment purposes. In order to exhange the press mold 26' it is merely necessary to detach the nut 19 and to swing the cover outwardly. In this manner the press mold ring 26' may be easily exchanged.

Because of the construction of the feed screw 55', which is of lesser diameter at its entrance than at its discharge, the material is accelerated to an extent that an even layer of material is formed in the interior portion 42. The acceleration of the material is a centrifugal acceleration.

A feature of the construction of FIG. 2 is that because it is not necessary to provide for any feeding device on the stands 2 and 3, the stands may be made of a very rugged construction. In addition, the driving system may be incorporated into a dust-proof rugged frame housing which results in a long life for the bearings and driving elements. Easy cleaning of the entire system is permitted by the fact that the system can be swingably arranged on the side of the frame housing facing away from the press driving system. All of the parts are easily accessible and may be adjusted or removed in a simple manner because of the manner in which the cover member is pivotally mounted.

In some instances, it is advantageous to provide a conical feed worm which rotates comparatively rapidly and which has an exit diameter essentially corresponding to the interior diameter of the press mold and which extends into the area of the press mold from the feeding hopper. In addition, the conical feed worm may include several gears in order to improve the uniform distribution of the materials to be pressed in the press mold.

All of the embodiments have the advantage that the driving system for the rotating rollers of the press molds is included in a dust-free compartment. In the embodiment of FIG. 3, a housing 10″ is similar to that of the other embodiments, but it includes a cover 11″ which is flanged to receive an intermediate pressure piece member 70 which is positioned to abut against a pressure mold ring 26″ in order to accurately position the latter in respect to the frame 2″ and a special wearing ring member 27″.

In the embodiment of FIG. 3, a housing 50″ is secured to the cover 11″ such as by bolts 13″ and it includes an end wall 50b″ providing a mounting base for a motor 52″ similar to the other embodiments. In this embodiment, however, the housing 50″ includes a ring portion having an axially projecting annular piston 62 which slidably fits into an annular recess or cylinder formed at the abutting end of the member 70. After the housing 50″ is bolted to the cover 11″, the tension force at which the member 70 exerts against the press mold ring 26″ and which is held by the frame 2″ may be controlled by inserting a pressure fluid into the annular space or cylinder 70a between a piston formation 62 and the cylindrical formation on the member 70. This may be done by the use of a manually operable piston pump 80 which is connected to the cylinder 70a through a conduit 81.

In the FIG. 3 embodiment, the feed conveyor generally designated 55″ includes a frusto conical core 55a″ which converges in a direction toward the press mold 26″. The surface of the feed conveyor 55″ is provided with a plurality of adjustable blades 151. The housing includes an interior cylindrical wall 66 which is comparable to the diameter of the interior of the press mold 26″. Material which is fed into the opening 65″ is advanced by the feed worm 55″ in the manner similar to the other embodiments. The blades 151 transport the material toward the press rollers 16″, 16″ where the material is evenly spread on the cylindrical wall 66 of the housing 50″. From the wall 66, the material is scraped off by the shovel elements 17″, 17″ and fed to the press rollers 16″, 16″. The press rollers 16″, 16″ press the material essentially radially outwardly through the press channels 25″ where the thus extruded material is cut off at predetermined lengths by the scraping knives 36″ to produce cubes of a predetermined length. The scraping knives 36″ are mounted similar to the other embodiments, with the exception that the annular element 34 is supported at a plurality of radial locations by rotating disc elements 32″. At least three of these disc elements 32″ are employed at radially spaced locations. The remaining drive is similar to that of the other embodiments.

The arrangement of FIG. 3 also permits easy exchange of the press mold 26″. In addition, the tensional force holding the press mold in position on the stand 2″ may be easily adjusted by the fluid pressure in the cylindrical space of the member 70. As in all of the embodiments, the feed conveyor 55″ provides for the even inflow of material and a spreading of an even layer of the material on the interior wall of the housing. This is essential in order to achieve the uniform length of the pressed cubes.

While specific embodiments of the invention have been shown and described in detail to illustrate the application of the inventive principles, it will be understood that the invention may be embodied otherwise without departing from such principles.

What is claimed is:

1. A press for the production of extruded parts of limited length comprising a mounting stand, a press mold ring affixed to said mounting stand and having a plurality of extrusion openings extending therethrough from the interior to the periphery thereof, at least one rotatable member having at least one press means mounted thereon which extends into the interior of said press mold ring from the same side as said mounting stand and located for pressing engagement over the interior surface of said press mold ring, first driving means connected to said rotatable member to rotate said member with said press means with respect to said press mold ring and extrude the material delivered between said press mold ring and said press means out through the openings thereof, a stationary feed housing connected to said press mold ring on the side thereof opposite to said stand and having a material inlet, a feed worm in said feed housing extending from said inlet toward said press mold ring, second driving means operative independently of said first driving means for rotating said feed worm for advancing the material to be extruded toward said press mold ring in evenly fed layers, at least one scrapper plate movable around the exterior periphery of said press mold ring for removing material pressed through the openings thereof, said scrapper plate being connected to said first driving means for rotation thereby around the periphery of said press mold ring.

2. A press according to claim 1 wherein said feed worm includes blades at least some of which are individually adjustable, said press means comprising at least one rotatable roller, a shovel associated with said rotatable press roller and extending from said press roller into scrapping engagement with the interior of said feed housing for delivering material from said housing to said press mold ring in uniform feed layers, said feed worm extending from the inlet of said feed housing to a location adjacent said press roller.

3. A press according to claim 1, including a cover for said press mold ring pivotally connected to said stand, said feed housing being mounted on said cover, said cover clamping said press mold ring against said stand.

4. A press according to claim 3, including individually adjustable tension means carried by said cover and bearing against said press mold ring to tension said ring in position on said stand.

5. A press according to claim 1, wherein said feed housing and said feed worm define a space therebetween of varying dimensions from said inlet to said press mold ring and blade disposed between said feed worm and the interior of said feed housing.

6. A press according to claim 1, including a scrapper carried by said rotatable member and extending into said feed housing for scrapping the interior wall of said feed housing and delivering the material evenly over the press mold ring, said feed worm being spaced from said press mold ring to form a space for the operation of said shovel to operate.

7. A press for the production of extruded parts of limited length comprising a mounting stand, a press mold ring affixed to said mounting stand and having a plurality of extrusion openings extending therethrough from the interior to the periphery thereof, at least one rotatable member having at least one press means mounted thereon which is supported on said rotatable member and extends into the interior of said press mold ring for pressing engagement over the interior surface of said press mold ring, first driving means connected to said rotatable member to rotate said member with said press means to cause said press means to move with respect to said ring and to extrude the material delivered between said ring and said press means out through the openings therethrough, a stationary feed housing connected to one side of said ring and having a material inlet, a feed worm in said feed housing extending from said housing toward said press mold ring, second driving means operative independently of said first driving means for rotating said feed worm for advancing the material to be extruded toward said press mold ring in evenly fed layers, said feed housing including an intermediate member abutting said press mold ring, an outer member abutting said intermediate member, means for applying tension from said outer member to said inner member against said ring including a piston and cylinder formed between said outer member and said intermediate member and means for applying pressure within said cylinder to force separation of said outer intermediate members and pressing of said press mold ring.

References Cited

UNITED STATES PATENTS

| | | |
|---|---|---|
| 2,075,450 | 3/1937 | E. N. Meakin. |
| 2,336,114 | 12/1943 | E. N. Meakin _____ 18—12 XR |
| 2,391,638 | 12/1945 | E. T. Meakin _____ 18—12 |
| 2,700,940 | 2/1955 | Johnson _____ 107—8.35 |
| 2,778,323 | 1/1957 | Money _____ 18—12 XR |
| 2,798,444 | 7/1957 | E. N. Meakin _____ 18—12 XR |
| 2,908,038 | 10/1959 | E. N. Meakin _____ 18—12 |
| 3,010,150 | 11/1961 | E. N. Meakin _____ 18—12 |
| 3,167,033 | 1/1965 | Kuhn _____ 18—12 XR |
| 3,167,813 | 2/1965 | Keefe _____ 18—12 |

WILLIAM J. STEPHENSON, *Primary Examiner.*